United States Patent [19]

Driessen et al.

[11] Patent Number: 5,216,737
[45] Date of Patent: Jun. 1, 1993

[54] OPTOELECTRONIC DEVICE COMPRISING A SEMICONDUCTOR LASER AND AN OPTICAL ISOLATOR

[75] Inventors: Johannes C. Driessen; Jan W. Kokkelink; Hendricus F. J. J. Van Tongeren, all of Eindhoven, Netherlands

[73] Assignee: U.S. Philips Corporation, New York, N.Y.

[21] Appl. No.: 834,417

[22] Filed: Feb. 12, 1992

[30] Foreign Application Priority Data

Feb. 28, 1991 [NL] Netherlands ............. 9100367

[51] Int. Cl.⁵ .............................. G02B 6/32
[52] U.S. Cl. ....................... 385/93; 372/36; 372/109; 385/34
[58] Field of Search ............. 385/34, 39, 93, 52, 385/73, 74, 92, 94; 372/36, 109

[56] References Cited

U.S. PATENT DOCUMENTS

| | | | |
|---|---|---|---|
| 4,616,899 | 10/1986 | Schlafer | 385/93 |
| 4,731,795 | 3/1988 | Clark et al. | 372/107 |
| 4,803,689 | 2/1989 | Shibanuma | 372/36 |
| 5,046,798 | 9/1991 | Yagiu et al. | 385/92 |
| 5,082,343 | 1/1992 | Coult et al. | 385/34 |
| 5,127,074 | 6/1992 | Wantanabe et al. | 385/34 |

Primary Examiner—James W. Davie
Attorney, Agent, or Firm—Leroy Eason

[57] ABSTRACT

The invention relates to an optoelectronic device comprising a semiconductor laser enclosed in an envelope, an optical fibre coupled to the semiconductor laser, and further coupled to at least one optical isolator and an outgoing optical fibre (pigtail). According to the invention, the semiconductor laser and the optical isolator are each enclosed in a separate module. The laser module mainly provides space to the semiconductor laser and to an optical fibre coupled thereto and ending in a ferrule in a tubular projection of the laser module. The module for the optical isolator is tubular in shape and contains in that order a first graded index lens, an optical isolator, a second graded index lens, and an outgoing optical fibre (pigtail) coupled to this second graded index lens through a ferrule. The tubular projection of the laser module and an end portion of the tubular optical module are so shaped in relation to one another that a mechanical coupling of the two modules can be obtained whereby the optical coupling between the modules is achieved simultaneously.

4 Claims, 3 Drawing Sheets

OPTOELECTRONIC DEVICE COMPRISING A SEMICONDUCTOR LASER AND AN OPTICAL ISOLATOR

BACKGROUND OF THE INVENTION

The invention relates to an optoelectronic device with a semiconductor laser and an optical isolator, comprising a semiconductor laser element enclosed in an envelope, an optical fibre coupled to the semiconductor laser element, which fibre is further coupled to at least one optical isolator consisting of two polarizers with an interposed Faraday rotator, and an outgoing optical fibre (pigtail).

There is an obvious demand nowadays for single mode lasers having low noise characteristics for application in, for example, optical telecommunication and video distribution, operating at very high frequencies. The distributed feedback (DFB) lasers generally used for these applications, however, are very sensitive to optical feedback. Especially reflections which may occur in the case of a less good coupling between two optical fibres have an unfavourable effect on the correct operation of these lasers. It has been suggested to include an optical isolator in the device to limit the optical feedback to the laser element. The aim then is to include the optical isolator in the envelope of the laser and thus to obtain a module construction. An example of such a module is given in JP 63-252497(A).

A module construction as described in JP 63-252497, however, also has disadvantages. The space available for insertion of further elements, such as the optical isolator, in a standard envelope of the semiconductor laser is small, so that the manufacture of such a module becomes intricate. Furthermore, it is no longer possible to couple the optical fibre directly to the laser element, whereas direct coupling leads to a favourable optical efficiency. If one of the components of the device shows a defect after assembly, this entire device, in which the expensive isolator has already been included, must be replaced.

SUMMARY OF THE INVENTION

The invention has for its object to provide an optoelectronic device of the kind described in the opening paragraph in which no restrictions obtain as to the technology of optical coupling between the semiconductor laser and the optical fibre, whose manufacture is not unnecessarily complicated, where testing of the components is possible before the device is assembled, and in which the application of various times of optical isolators, as well as the use of several optical isolators is possible in a very simple manner, while nevertheless a module construction is possible.

To achieve this object, according to the invention, the optoelectronic device described in the opening paragraph is characterized in that the semiconductor laser and the optical isolator are each included in a separate module, in that the laser module provides space mainly for the semiconductor laser element and an optical fibre coupled thereto which ends in a ferrule which is enclosed in a substantially tubular projection of the laser module, in that the module for the optical isolator is substantially tubular in shape, this module containing in that order a first graded index lens, at least one optical isolator, a second graded index lens, and an outgoing optical fibre (pigtail) coupled to this second graded index lens by means of a ferrule, the tubular projection of the laser module and an end portion of the tubular optical module being so shaped in relation to one another that a mechanical coupling of the two modules can be achieved, whereby the optical coupling between the two modules takes place simultaneously.

The optoelectronic device according to the invention consists of two modules which can be eventually united. Thus a greater freedom in the constructional assembly is obtained than in the case where a single module is used. It is possible, for example, to realise any desired coupling between the semiconductor laser and the optical fibre in the laser module, also a direct coupling. Furthermore, the two modules may be separately tested before they are interconnected, so that costly rejects are avoided. The manufacture of the separate modules can also be arranged in a simpler manner than the manufacture of a single, complicated module. The construction comprising two modules also renders it possible in a simple manner to connect optical isolators of different construction to the standard laser module. The separate isolator module also renders it simple, for example, to build in more than one isolator if the isolation value has to be extra high. The use of the two separate modules, each provided with a connection part which renders a simple assembly possible, therefore, affords a much greater degree of freedom of action than the use of a single laser module provided with an optical isolator.

In a favourable embodiment of the optoelectronic device according to the invention, the semiconductor laser consists of a distributed feedback (DFB) semiconductor laser and the optical coupling between the laser element and the optical fibre included in the laser module is constructed as a tapered pigtail. A very effective coupling to a DFB laser is obtained in this way.

A further embodiment of the invention is characterized in that the ferrule in which the end of the optical fibre of the laser module is enclosed and the end of the first graded index lens which points towards said ferrule in the assembled state of the two modules are of plane construction and enclose a small angle with a plane which is prependicular to the optical axis of the assembly, while a small interspacing is present between the said planes.

The transition between these planes can lead to considerable reflections. Owing to the oblique positioning of the two planes, a feedback to the laser element is avoided. The presence of a small interspacing between these planes will cause the substantially parallel light beam from the laser element to leave the graded index lens at a small angle. As a result, reflections from all surfaces hit by the beam and positioned roughly perpendicularly to the optical axis will be imaged beside the fibre core, so that feedback to the laser will not occur.

The interspacing between the planes of the ferrule and the first graded index lens has an excellent effect if its size lies between 50 $\mu$m and 500 $\mu$m, and is preferably approximately 200 $\mu$m.

BRIEF DESCRIPTION OF THE DRAWING

The invention will be explained in more detail with reference to an embodiment shown in the drawing. In the drawing.

DETAILED DESCRIPTION OF THE PREFERRED EMBODIMENT

The optoelectronic device according to the invention has a module construction. However, not a single module was opted for, but the device is formed as an assembly of a laser module and an isolator module. Advantages of this have been indicated above; further favourable aspects will be elucidated in the following description.

Figure 1:
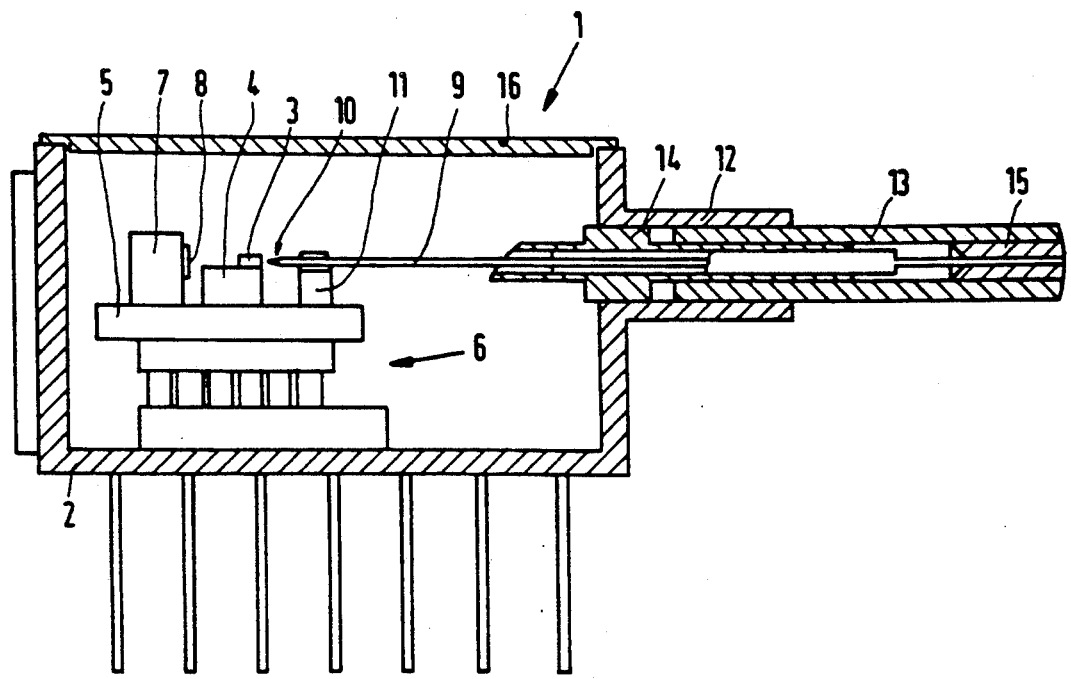
FIG. 1 shows a cross-section of an embodiment of the laser module.

FIG. 1 shows an embodiment of a laser module 1 which can be used in the optoelectronic device according to the invention. The embodiment shown comprises a standard envelope of the DIL 14 type. A laser element 3 in the housing 2 is provided on a cooling block 4 which is present on a support 5. This support is placed on a Peltier cooling device which is generally designated with the reference numeral 6. On the support 5 there is also a holder 7 to which a photodiode 8 is fastened. The photodiode 8 measures the quantity of light radiated by the laser diode; the signal generated in the photodiode is used for controlling the emission intensity of the semiconductor laser diode 3.

An optical fibre 9 is coupled to the semiconductor laser diode 3. In the embodiment shown, a direct coupling of the laser light in the fibre 9 is used, a tapered glass fibre (tapered pigtail) being used. This coupling technology, which is known per se, has a very favourable efficiency. The fibre is included in a support 11 near its tapering end 10. The housing 2 has a tubular projection 12 which surrounds a tube portion 13 which guides the optical fibre 9 issuing from the envelope. The optical fibre is guided from the envelope in a carrier element 14; the end of the fibre is enclosed in a portion 15 of the ferrule 13, 15. A cover 16 hermetically seals off the envelope.

The unit depicted in FIG. 1 by way of example forms a laser module developed for use in an optoelectronic device in cooperation with a module for an optical isolator, preferably in a device operating at very high frequencies for telecommunication or video distribution. Preferably, a DFB semiconductor laser is used for this, while coupling to the optical fibre takes place by means of the tapered pigtail coupling technology. This module may be separately adjusted and tested before it is connected to a module of an optical isolator. It is achieved by this on the one hand that it can be checked whether the operation of the laser module is optimum before the expensive total unit is assembled, and on the other hand that a possibility is created for connecting the laser module to optical isolators of different construction.

Especially the DFB semiconductor laser suitable for very high frequencies are sensitive to optical feedback, which may lead to comparatively high noise levels. There is accordingly a clear demand for an optoelectronic device provided with a laser and with one or several optical isolators.

Figure 2:
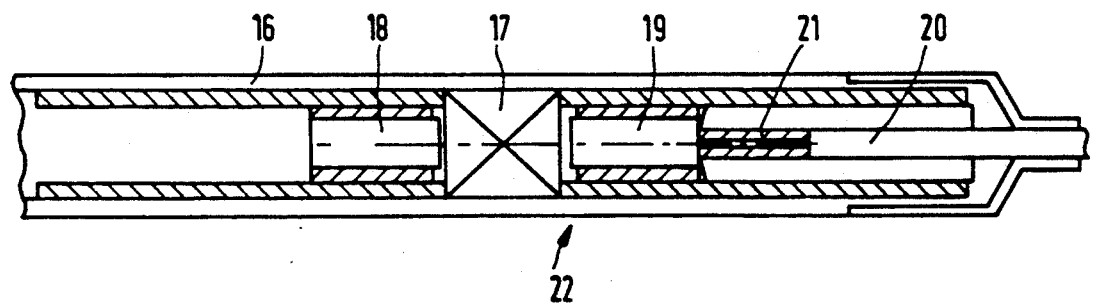
FIG. 2 shows a cross-section of an embodiment of an isolator module.

FIG. 2 shows an embodiment of an optical isolator suitable for cooperating with the laser module of FIG. 1. An optical isolator 17 is enclosed in a tubular holder 16. Such an isolator ensures that light is transmitted in one direction only, or that the polarization of the light is changed in such a way that the reflected light has no influence on the laser anymore. The isolator 17 consists, in a manner known per se, of two polarizers with an interposed Faraday rotator. Yttrium-Iron-Garnet (YIG) crystals are often used for the Faraday rotator, while the polarizers usually consist of calcide or plate polarizers.

The optical coupling to the glass fibre of the laser module takes place by means of a graded index lens 18, which in its turn is optically coupled to the isolator 17. The isolator 17 is coupled to a further graded index lens 19 at its output side. Coupling to the outgoing optical fibre 20 (pigtail) takes place through a a ferrule 21 in which an end of said fibre is enclosed.

The module 22 of the optical isolator depicted in FIG. 2 may be connected to the laser module 1 by means of the tubular holder 16 so as to form a unit. First, however, the laser module and the expensive optical module may be tested for their characteristics, so that correct modules only are joined together into an assembly. It will be obvious that both the embodiment of the laser module 1 shown in FIG. 1 and the isolator module 22 in FIG. 2 only form an example of an optoelectronic device to be assembled. Thus it is possible, for example, to include one (or several) further isolator(s) in series with the isolator 17 in the module 22 for the optical isolator to obtain a greater optical isolation.

Figure 4:
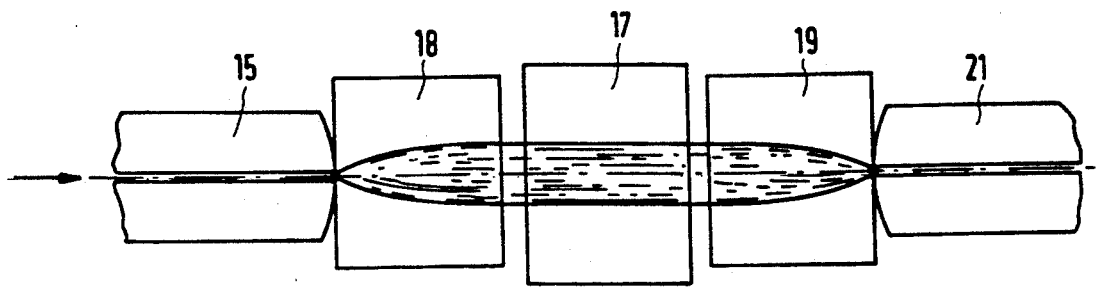
FIG. 4 is a diagrammatic picture of the optical arrangement of the isolator coupling.

FIG. 4 diagrammatically shows the optical system of the optical module shown in FIG. 2, consisting of ferrule 15 of the laser module 1, the graded index lens 18, the optical isolator 17, the graded index lens 19, and the ferrule 21 for the pigtail 20. Such an optical system must have an isolation value of more than 30 dB. In practice, reflections appear still to be possible in this construction, adversely affecting the signal-to-noise ratio. An embodiment of the optical system as diagrammatically shown in FIG. 4 is more favourable, and it makes an inventively important contribution to the optoelectronic device according to the invention.

Figure 5:
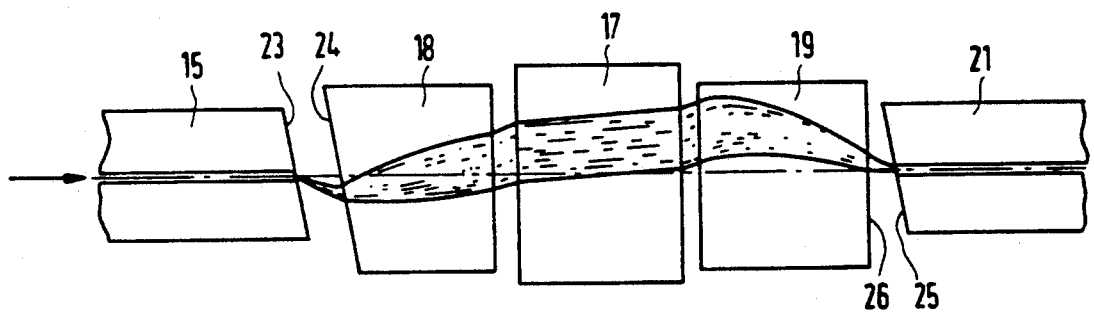
FIG. 5 is a diagrammatic picture of a modified construction of the isolator coupling of FIG. 4.

The optical system of FIG. 5 avoids to a high degree the feedback of undesirable reflections into the semiconductor laser 3. In this optical system, the mutually facing surfaces 23 and 24 of the ferrule 15 and the graded index lens 18 enclose a small angle with a plane perpendicular to the axis of the optical system, while a free interspacing is created between these planes of approximately 20 to 500 $\mu$m, preferably approximately 200 $\mu$m. Furthermore, the surface of the ferrule 21 facing the graded index lens 19 is positioned at a small angle to a plane perpendicular to the axis of the optical system, while this plane is a small distance from the plane 26 of the graded index lens 19. The angle between the plane 23 of the ferrule 15 and the plane 24 of the graded index lens prevents reflections from the latter plane. The interspacing between these planes leads to an offset in the x-direction (virtual image), so that the beam will leave the graded index lens at a small angle. Reflections from all surfaces substantially perpendicular to the axis of the optical system are then imaged next to the fibre core and will accordingly not influence laser performance. The oblique surface 25 of ferrule 21 and the end of the fibre 20 enclosed therein together with the interspacing between the planes 25 and 26 ensure that the beam enters the end of the fibre 20 correctly centred and substantially axially.

Figure 3:
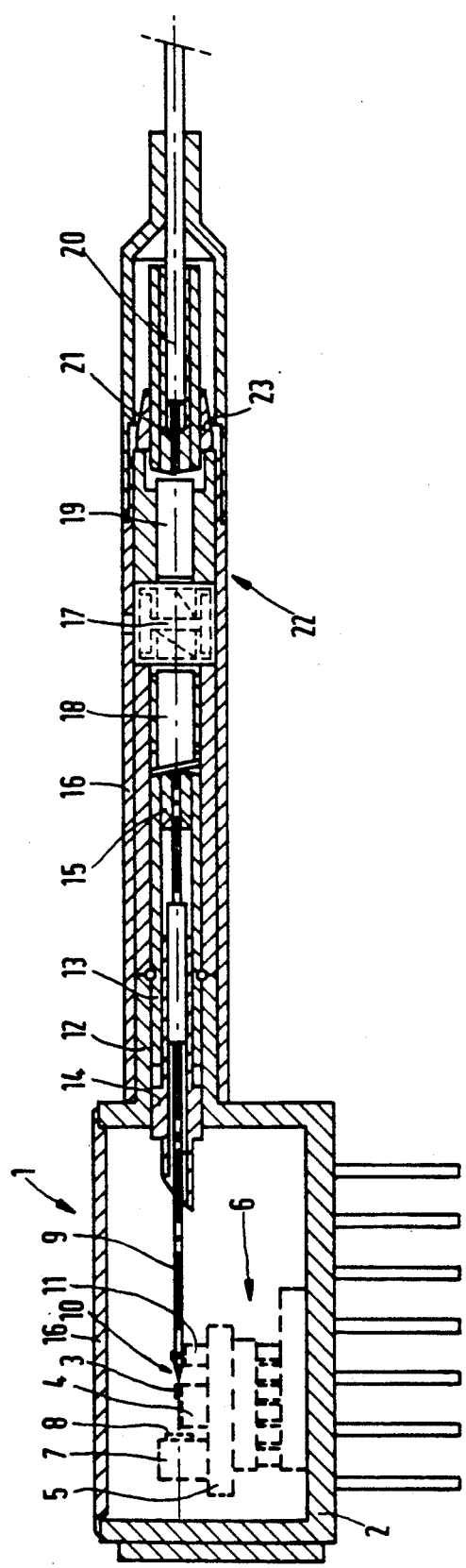
FIG. 3 shows a cross-section of a laser assembly with an optical isolator, the isolator module being modified compared with the isolator module of FIG. 2.

FIG. 3 shows an assembly of a laser module as shown in FIG. 1 and a module for an optical isolator with an optical system as depicted diagrammatically in FIG. 5. The laser module 1 corresponds to the module shown in FIG. 1. The optical module shows, besides the optical system diagrammatically depicted in FIG. 5, an output for the pigtail 20 which is adjustable in the x- y- and z-directions relative to the graded index lens 19. To this end, the pigtail 20 with ferrule 21 is included in an adjustment element 23. The ferrule 21 can be axially adjusted therein relative to the graded index lens 19, while the adjustment element 23 itself is adjustable in a direction perpendicular to the optical axis. Thus an excellent coupling between the lens 19 and the ferrule 21 of the pigtail 20 can be achieved.

It will be obvious that the embodiments shown only serve as examples to illustrate the invention and that constructional changes are possible within the scope of the invention.

I claim:

1. An optoelectronic device with a semiconductor laser and an optical isolator, comprising a semiconductor laser element enclosed in an envelope, an optical fibre coupled to the semiconductor laser element, which fibre is further coupled to at least one optical isolator consisting of two polarizers with an interposed Faraday rotator, and an outgoing optical fibre (pigtail), characterized in that the semiconductor laser and the optical isolator are each included in a separate module, in that the laser module provides space mainly for the semiconductor laser element and an optical fibre coupled thereto which ends in a ferrule which is enclosed in a substantially tubular projection of the laser module, in that the module for the optical isolator is substantially tubular in shape, this module containing in that order a first graded index lens, at least one optical isolator, a second graded index lens, and an outgoing optical fibre (pigtail) coupled to this second graded index lens by means of a ferrule, the tubular projection of the laser module and an end portion of the tubular optical module being so shaped in relation to one another that a mechanical coupling of the two modules can be achieved, whereby the optical coupling between the two modules takes place simultaneously.

2. An optoelectronic device as claimed in claim 1, characterized in that the semiconductor laser consists of a distributed feedback (DFB) semiconductor laser and the optical coupling between the laser element and the optical fibre included in the laser module is constructed as a tapered pigtail.

3. An optoelectronic device as claimed in claim 1, characterized in that the ferrule in which the end of the optical fibre of the laser module is enclosed and the end of the first graded index lens which points towards said ferrule in the assembled state of the two modules are of plane construction and enclose a small angle with a plane which is perpendicular to the optical axis of the assembly, while a small interspacing is present between the said planes.

4. An optoelectronic device as claimed in claim 3, characterized in that the interspacing present between the planes of the ferrule and of the first graded index lens has a dimension of 50 to 500 $\mu$m, preferably approximately 200 $\mu$m.

* * * * *